US012697810B2

(12) United States Patent
Ichikawa

(10) Patent No.: US 12,697,810 B2
(45) Date of Patent: Aug. 4, 2026

(54) DRIVE DEVICE

(71) Applicant: RISO Technologies Corporation, Tokyo (JP)

(72) Inventor: Masaya Ichikawa, Tagata Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 161 days.

(21) Appl. No.: 18/680,352

(22) Filed: May 31, 2024

(65) Prior Publication Data

US 2025/0074047 A1 Mar. 6, 2025

(30) Foreign Application Priority Data

Aug. 28, 2023 (JP) ................................ 2023-138430

(51) Int. Cl.
*B41J 2/045* (2006.01)

(52) U.S. Cl.
CPC ....... *B41J 2/04588* (2013.01); *B41J 2/04541* (2013.01); *B41J 2/04581* (2013.01); *B41J 2/04591* (2013.01)

(58) Field of Classification Search
CPC ......................... B41J 2/04588; B41J 2/04541; B41J 2/04581; B41J 2/04596; B41J 2/04591; B41J 2/04593; B41J 2/04508; B41J 2/04513; B41J 2/04516; B41J 2/04525; B41J 2/04535; B41J 2/04551; B41J 2/04573; B41J 2/04583; B41J 2/04595; B41J 2/04598; B41J 2/0459
See application file for complete search history.

(56) References Cited

U.S. PATENT DOCUMENTS

| | | | |
|---|---|---|---|
| 6,328,395 | B1 | 12/2001 | Kitahara |
| 6,464,315 | B1 | 10/2002 | Otokita |
| 6,899,409 | B2 | 5/2005 | Kusunoki |
| 10,500,844 | B2 | 12/2019 | Watanabe |

OTHER PUBLICATIONS

Extended European Search Report dated Jan. 22, 2025, mailed in counterpart European Application No. 24196493.1, 8 pages.

*Primary Examiner* — Kristal Feggins
(74) *Attorney, Agent, or Firm* — Kim & Stewart LLP

(57) ABSTRACT

A drive device includes a drive circuit to output a drive signal that is to be applied to an actuator of a liquid ejection head for ejecting liquid droplets. The drive signal includes an adjustment ejection waveform portion that includes a first portion having an expansion pulse that decreases pressure in a pressure chamber of the actuator and a second portion having a contraction pulse that increases pressure in the pressure chamber. The contraction pulse includes voltage increase changes that change the voltage applied to the actuator stepwise and a return pulse that is between a pair of voltage increase changes. The return pulse changes from a first voltage level that is less than a maximum voltage level of the contraction pulse to a second voltage level that is greater than a minimum voltage level of the expansion pulse.

20 Claims, 10 Drawing Sheets

DRIVE DEVICE

CROSS-REFERENCE TO RELATED APPLICATION

This application is based upon and claims the benefit of priority from Japanese Patent Application No. 2023-138430, filed Aug. 28, 2023, the entire contents of which are incorporated herein by reference.

FIELD

Embodiments described herein relate generally to a drive device for a liquid ejection apparatus.

BACKGROUND

In a liquid ejection head, such as an inkjet head, the relationship between ejection speed and ejection volume can be set depending on the ink used, the structures associated with the actuator in the head, and the drive waveform input to the actuator. For a specific combination of head design and ink, there can be a correlation between the ejection speed and the ejection volume by changing the voltage applied to the actuator by the drive waveform for ejection. In order to use a liquid ejection apparatus with printing performance that deviates from this established relationship between the speed and the volume without changing the head design or ink, the drive waveform needs to be changed. However, when the drive waveform is changed, there is a possibility that the ejection speed and ejection volume may deviate substantially from the existing ejection speed and the ejection volume relationship, and thus obtaining a desired ejection speed and ejection volume may be hard. In particular, reducing the ejection volume without changing the ejection speed is often hard to achieve.

In such an inkjet head, the ejection volume is required to be finely adjusted.

DETAILED DESCRIPTION

Embodiments provide a drive device that can adjust the ejection volume of a liquid ejection head or the like.

In general, according to one embodiment, a drive device includes a drive circuit configured to output a drive signal waveform to be applied to an actuator of a liquid ejection head. The drive signal waveform includes an adjustment ejection waveform portion that includes a first portion having an expansion pulse that decreases pressure in a pressure chamber of the actuator and a second portion having a contraction pulse that increases pressure in the pressure chamber. The contraction pulse includes a plurality of voltage increase changes that change the voltage applied to the actuator in a stepwise manner and a return pulse that is between a pair of voltage increase changes in the plurality of voltage increase changes. The return pulse changes from a first voltage level that is less than a maximum voltage level of the contraction pulse to a second voltage level that is greater than a minimum voltage level of the expansion pulse.

Figure 1:
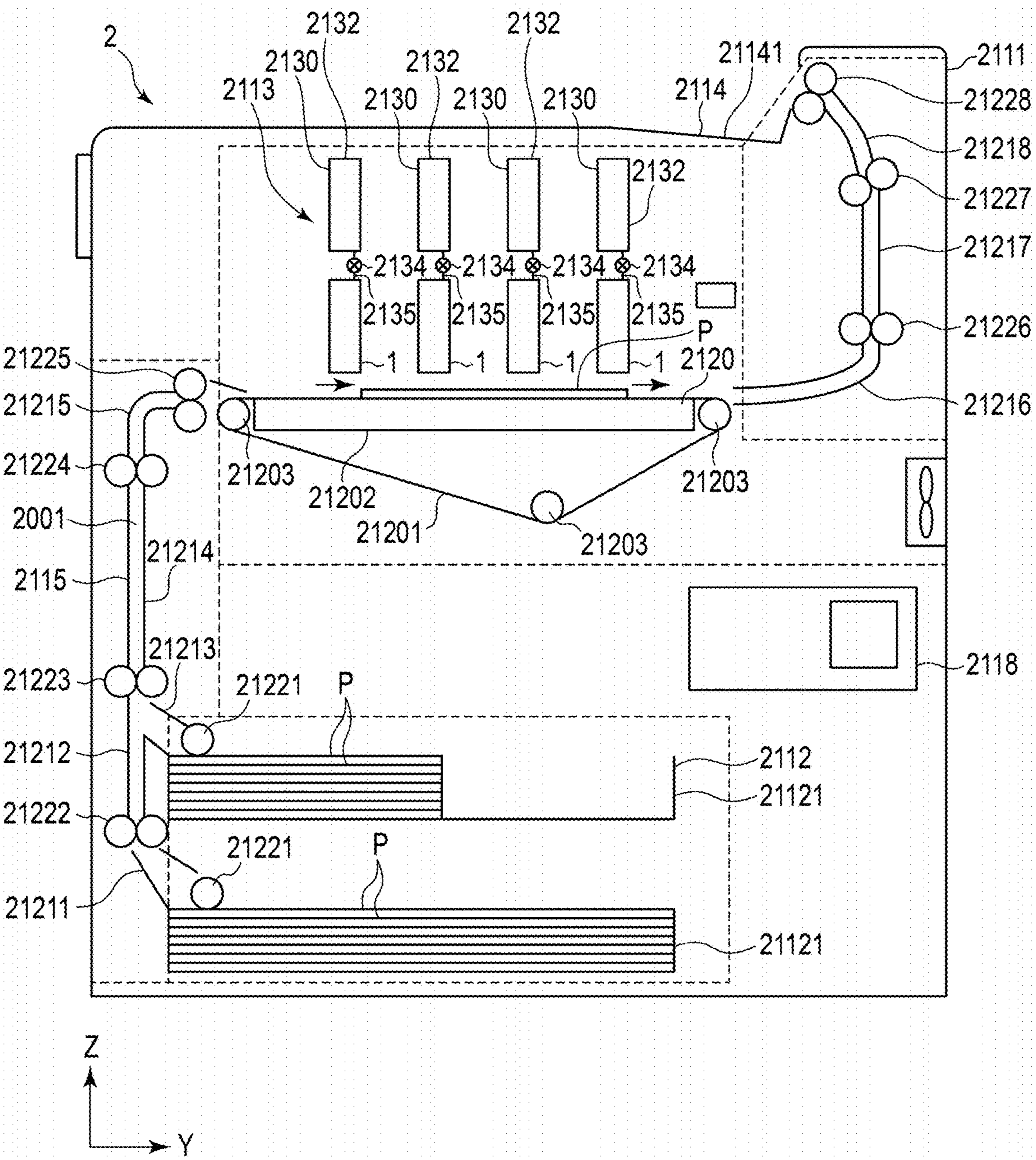
FIG. 1 depicts a liquid ejection apparatus according to a first embodiment.
Figure 2:
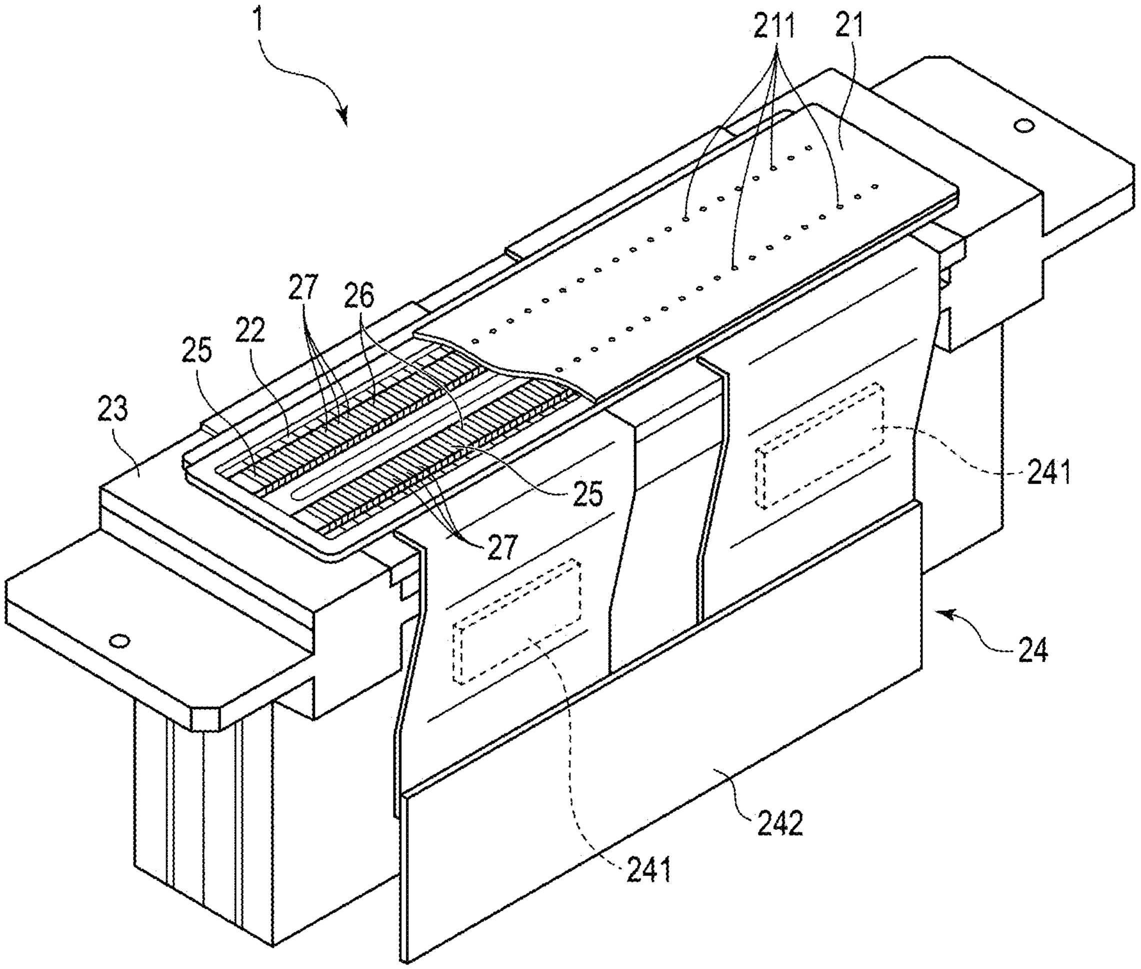
FIG. 2 depicts aspects of a liquid ejection head.
Figure 3:
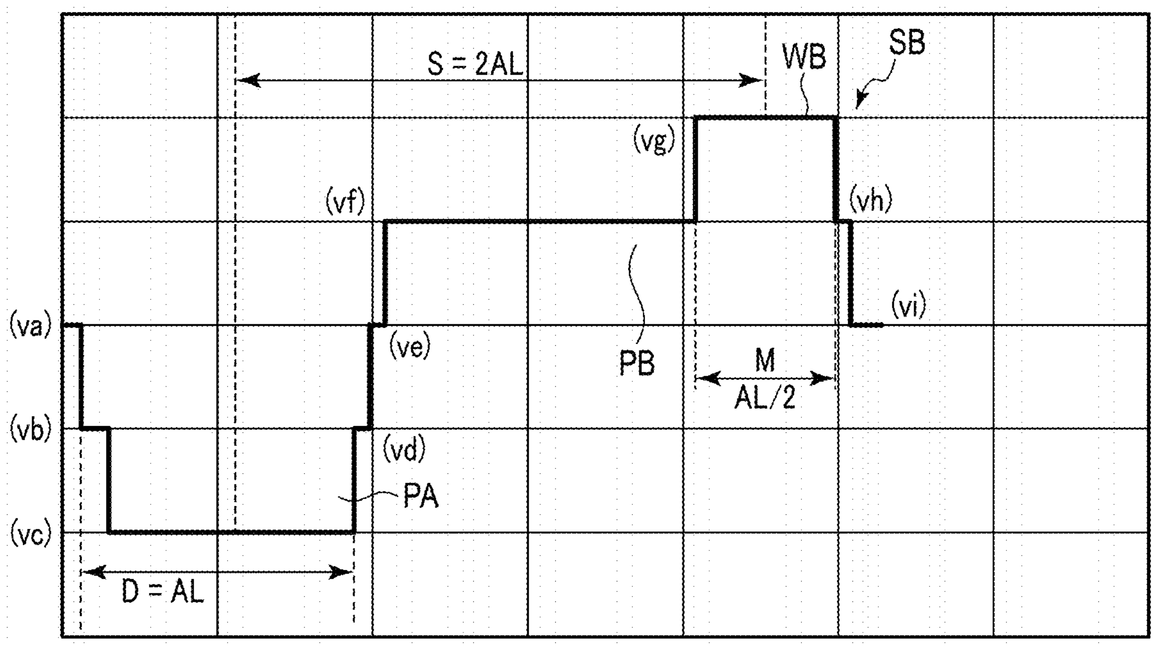
FIG. 3 illustrates a reference ejection waveform.
Figure 4:
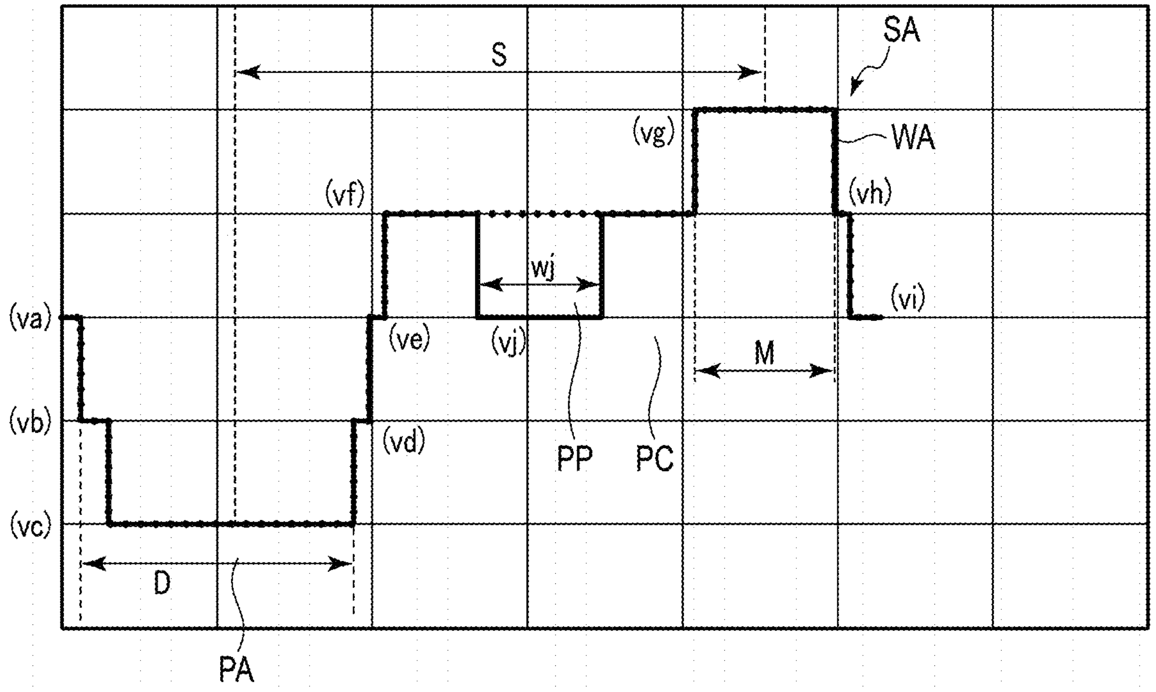
FIG. 4 illustrates an adjustment ejection waveform.

A liquid ejection head 1 and a liquid ejection apparatus 2 using the liquid ejection head 1 according to the first embodiment will be described below with reference to FIGS. 1 to 4. FIG. 1 depicts a configuration of the liquid ejection apparatus 2 according to the first embodiment. FIG. 2 is a perspective view illustrating aspects of the liquid ejection head 1. FIG. 3 is a waveform diagram illustrating a reference ejection waveform in the first embodiment. FIG. 4 is a waveform diagram illustrating an adjustment ejection waveform. In each waveform diagram, the vertical axis represents voltage (V), and the horizontal axis represents time (μs).

The aspects depicted in the accompanying figures are not necessarily to scale and aspects may be enlarged, reduced, and/or omitted for purposes of clarity or otherwise.

The liquid ejection apparatus 2 including the liquid ejection head 1 will be described with reference to FIG. 1. The liquid ejection apparatus 2 includes a housing 2111, a medium supply unit 2112, an image forming unit 2113, a medium discharge unit 2114, a conveyance device 2115 that is a support device, and a control unit 2118.

The liquid ejection apparatus 2 is an inkjet printer that performs an image forming processing on paper P by ejecting ink the paper P, or other recording medium, conveyed along a conveyance path 2001 from the medium supply unit 2112 through the image forming unit 2113 to the medium discharge unit 2114.

The medium supply unit 2112 includes a plurality of paper feed cassettes 21121. The image forming unit 2113 includes a support unit 2120 that supports the paper P during image forming processing. A plurality of head units 2130 are located above the support unit 2120. The medium discharge unit 2114 includes a paper discharge tray 21141.

The support unit 2120 includes a conveyance belt 21201 provided in a loop shape, a support plate 21202 that supports the conveyance belt 21201 from the back side, and a plurality of belt rollers 21203 provided on the back side of the conveyance belt 21201.

The head unit 2130 includes a plurality of liquid ejection heads 1 that are inkjet printheads in this example, a plurality of supply tanks 2132 mounted on respective liquid ejection heads 1, pumps 2134, and connection flow channels 2135 connecting the liquid ejection heads 1 and the supply tanks 2132.

Ink stored in the supply tank 2132 is supplied to the liquid ejection head 1. The liquid ejection head 1 may be a non-circulating type head through which ink does not circulate or a circulating type head through which ink circulates (from a supply tank 2132 and back).

In this first embodiment, liquid ejection heads 1 for four colors (cyan, magenta, yellow, and black) are provided along with the corresponding supply tanks 2132 for ink (liquid) of these four colors. Each supply tank 2132 is connected to a liquid ejection head 1 by a connection flow channel 2135.

As illustrated in FIG. 2, the liquid ejection head 1 is an inkjet head and includes a nozzle plate 21 having a plurality of nozzles 211, an actuator substrate 22, a manifold 23 joined to the actuator substrate 22, and a drive circuit 24.

The actuator substrate 22 includes an actuator 25, which includes a plurality of pressure chambers 26 connected to the nozzles 211. Drive element units 27 are adjacent to the pressure chambers 26. The actuator substrate 22 provides a flow channel passing through pressure chambers 26. This flow channel is formed between the actuator substrate 22 and the nozzle plate 21.

An electrode connected to the drive circuit 24 is formed for the drive element unit 27. The electrode is connected to the control unit 2118 via the drive circuit 24 by wiring or the like. The electrode (and thus the corresponding drive element unit 27) is configured to be independently controllable under control of a processor or the like.

The drive circuit 24 includes a driver IC 241 and wiring boards 242. The drive circuit 24 drives the actuator 25 using the driver IC 241 by applying a drive voltage to a wiring pattern of the actuator 25. This serves to increase (expand) or decrease (contract) the volume of a pressure chamber 26, which in turn causes droplets to be ejected from the nozzle 211 associated with the pressure chamber 26. That is, the drive circuit 24 outputs a drive signal having a drive waveform to the actuator 25.

For example, the driver IC 241 generates a control signal and a drive signal for operating each drive element unit 27. The driver IC 241 generates a control signal for selecting the timing for ejecting ink, selecting the particular drive element unit(s) 27 for ejecting ink, and the like according to an image signal input from the control unit 2118 of the liquid ejection apparatus 2. The driver IC 241 generates the voltage to be applied to the drive element unit 27 as a drive signal (electric signal). When the driver IC 241 applies the drive signal to a drive element unit 27, the drive element unit 27 operates to change the internal volume of the pressure chamber 26. With this driving, the ink in the pressure chamber 26 can be ejected from the nozzle 211 associated with the pressure chamber 26. The liquid ejection head 1 may be configured to realize gradation expression (grayscale printing) by changing the amount of ink droplets that land for each pixel. Further, the liquid ejection head 1 may be configured to be able to change the number of ink droplets that land for each pixel by changing the number of ink ejections.

For example, the driver IC 241 includes a data buffer, a decoder, and a driver. The data buffer stores print data for each drive element unit 27 in chronological (sequence) order. The decoder controls the driver for each drive element unit 27 based on print data stored in the data buffer. The driver outputs a drive signal that operates each drive element unit 27 based on the control of the decoder. The drive signal is a voltage applied to each drive element unit 27.

The liquid ejection head 1 includes the nozzle plate 21, the actuator substrate 22, and the manifold 23, which together form a flow channel passing through the pressure chambers 26. The flow channel of the liquid ejection head 1 is connected to the connection flow channel(s) 2135 of the liquid ejection apparatus.

Each pump 2134 is, for example, a liquid transfer pump configured as a piezoelectric pump. The pump 2134 is connected to the control unit 2118 and is driven and controlled by the control unit 2118.

The connection flow channel 2135 can include a supply flow channel connected to an ink supply pipe of the liquid ejection head 1 and a recovery flow channel connected to an ink discharge pipe of the liquid ejection head 1. For example, if the liquid ejection head 1 is a non-circulating type, the recovery flow channel can be connected to a maintenance device, and if the liquid ejection head 1 is a circulating type, the recovery flow channel is connected to the supply tank 2132.

The conveyance device 2115 conveys the paper P along the conveyance path 2001 from the paper feed cassette 21121 of the medium supply unit 2112 through the image forming unit 2113 to the paper discharge tray 21141 of the medium discharge unit 2114. The conveyance device 2115 includes a plurality of guide plate pairs (guide plate pairs 21211 to 21218) and a plurality of conveyance rollers (conveyance rollers 21221 to 21228) located along the conveyance path 2001. The conveyance device 2115 moves the paper P relative to the liquid ejection head 1.

The control unit 2118 is, for example, a control board. The control unit 2118 can be equipped with a processor, a read only memory (ROM), a random access memory (RAM), an I/O port, and an image memory.

The processor is a processing circuit or a controller such as a central processing unit (CPU). The processor controls a head unit 2130, a drive motor, an input operation unit, various sensors, and the like provided in the liquid ejection apparatus 2 through signals and the like passed through the I/O port. The processor sends print data stored in the image memory to the drive circuit 24 in the order (sequence) for drawing. The processor can be, for example, a central processing unit (CPU), a micro processing unit (MPU), a system on a chip (SoC), a digital signal processor (DSP), a graphics processing unit (GPU), or a combination thereof.

The ROM stores various programs and the like. The RAM temporarily stores various variable data, image data, and the like. The I/O port is an interface unit that receives data from the outside and outputs data to the outside. Print data from an external device can be transmitted to the control unit 2118 through the I/O port and stored in the image memory.

Hereinafter, the characteristics of the liquid ejection head 1 used in the liquid ejection apparatus 2 according to certain embodiments and a drive waveform generated by the drive circuit 24 of the liquid ejection head 1 will be described. The drive waveform generated by the drive circuit 24 includes an adjustment ejection waveform WA. The driving method of the liquid ejection head 1 is, for example, a multi-drop driving in which a liquid droplet is ejected by multiple ejection operations. That is, the adjustment ejection waveform WA can be provided in any one drive pattern of a plurality of drive patterns used in a drive waveform for ejecting any one drop of a plurality of drops in a sequence. That is, the drive circuit 24 drives the actuator 25 with a multi-step gradation drive waveform with multi-drop signals of a plurality of different patterns (a plurality of pattern types) including as a one pattern the adjustment ejection waveform WA.

The control unit 2118 sets the drive waveform to be applied to each drive element based on the print data. The control unit 2118 respectively drives the drive elements that respectively correspond to the nozzles 211 using various waveform patterns (including the adjustment ejection waveform WA) based on the print data.

For example, the control unit 2118 serves as an adjustment unit configured to adjust the ejection volume by setting conditions for the drive waveform. That is, a position (timing) and width (pulse width) of a return pulse waveform portion PP can be set depending, for example, on the ejection volume to be used. The control unit 2118 can adjust a pulse width of a return pulse by setting the drive waveform and adjust the ejection volume. Alternatively, an adjustment unit to adjust the pulse width of the return pulse and adjust the ejection volume by generating a drive waveform with the drive circuit 24 may be adopted.

Below, the adjustment ejection waveform WA provided in a drive waveform of a drive signal SA and a reference ejection waveform WB provided in a drive waveform of a drive signal SB will be described according to FIGS. 3 and 4. FIG. 3 is a waveform diagram illustrating the reference ejection waveform WB according to this example embodiment. The vertical axis represents voltage (V), and the horizontal axis represents time (μs). For example, the reference ejection waveform WB is an ejection waveform that causes liquid to be ejected once (as a single droplet) from the nozzle 211 by expansion and contraction.

The reference ejection waveform WB includes a decrease waveform portion PA having a decrease pulse that decreases ink pressure in the pressure chamber (e.g., expands the pressure chamber) and an increase waveform portion PB having increase pulses that increase the ink pressure in the pressure chamber (e.g., contracts the pressure chamber) in a stepwise manner such as in discrete steps or stages.

The reference ejection waveform WB includes the decrease waveform portion PA and the increase waveform portion PB in this sequence order.

The decrease waveform portion PA changes from a zero potential va to a first negative potential vb to a second negative potential vc to a first negative potential vd then to a zero potential ve. The magnitude of the first negative potential (vb and vd) is some potential between the zero potential va and the second negative potential vc. For example, the first negative potential (vb and vd) is ½ the magnitude of the second negative potential vc.

The increase waveform portion PB changes from zero potential ve to a first positive potential vf to a second positive potential vg to a first positive potential vh, to a zero potential vi.

That is, in the increase waveform portion PB, the voltage is increased stepwise in two steps (stages), and then returns to zero potential (vi) stepwise in two steps (stages).

The magnitude of the first positive potential (vf and vh) is some positive potential between the zero potential ve and the second positive potential vg. For example, the first positive potential (vf and vh) is ½ the magnitude of the second positive potential vg.

That is, the reference ejection waveform WB has a waveform that changes in the sequence order of the zero potential va, the first negative potential vb, the second negative potential vc, the first negative potential vd, the zero potential ve, the first positive potential vf, the second positive potential vg, the first positive potential vh, and the zero potential vi.

The transition from the zero potential ve to the first positive potential vf can be referred to as a first step increase. The transition from the first positive potential vf to the second positive potential vg can be referred to as a second step increase. The transition from the second positive potential vg to the first positive potential vh can be referred to as the end of a first application step. The transition from the first positive potential vh to the zero potential vi can be referred to as the end of a second application step.

The zero potential in this context is a reference potential such as a ground potential or approximately so.

The decrease waveform portion PA is an example of a first waveform portion that drives the actuator 25 so as to reduce the pressure in the pressure chamber. The increase waveform portion PB is an example of a second waveform portion that drives the actuator 25 so as to increase the pressure in the pressure chamber.

At the start of application of the reference ejection waveform WB, the zero potential va is applied for a fixed time. After the zero potential va, application of the decrease waveform portion PA is started. The decrease waveform portion PA changes from the zero potential va to the first negative potential vb and then from the first negative potential vb to the second negative potential vc. After reaching the second negative potential vc, the decrease waveform portion PA continues to hold the second negative potential vc until a time D elapses from the start of the decrease waveform portion PA. After the time D elapses, the decrease waveform portion PA then starts changing from the second negative potential vc to the first negative potential vd and then from the first negative potential vd to the zero potential ve.

For the reference ejection waveform WB, the application of the increase waveform portion PB is started after the zero potential ve is held for a predetermined time after the decrease waveform portion PA ends.

The increase waveform portion PB changes from the zero potential ve to the first positive potential vf, and holds the first positive potential vf for a predetermined time, and then changes from the first positive potential vf to the second positive potential vg. Then, after a predetermined time from the start of the increase waveform portion PB, the increase waveform portion PB changes from the second positive potential vg to the first positive potential vh. Then, the increase waveform portion PB holds the first positive potential vh for a predetermined time, and then changes from the first positive potential vh to the zero potential vi.

The time D is preferably one half of the natural vibration period of the pressure chamber 26. A time equal to one half of the natural vibration period of the pressure chamber 26 is defined as 1 acoustic length (AL). That is, the time D is preferably equal to 1 AL. For example, the time D (first pulse width) is set to 1 AL so that an amplitude of a generated pressure wave will be at a maximum, and the time M (second pulse width) of a contraction pulse after the second increase is set to a pulse width that minimizes vibrations generated by the drive waveform up to that time point. For example, the time M is desirably shorter than 1 AL, for example, AL/2. The time S from the center of the contraction pulse after the second increase to the center of contraction pulse after the second increase of the increase waveform portion PB can be set to 2 AL.

Next, the adjustment ejection waveform WA provided in the drive signal SA (also referred to as a drive signal waveform) according to this first embodiment will be described with reference to FIG. 4. FIG. 4 depicts an adjustment ejection waveform WA according to this first embodiment, where the vertical axis represents voltage (V) and the horizontal axis represents time (μs). For example, the waveform WA is an ejection waveform that causes liquid to be ejected once from the nozzle 211 by a cycle of expansion and contraction. That is, the adjustment ejection waveform WA a decrease pulse that decreases the ink pressure in the pressure chamber and a return pulse waveform portion PP with multiple increase pulses that increase the ink pressure in the pressure chamber stepwise and returns to a return potential at a level between the increase potential of the increase pulse and the decrease potential of the decrease pulse at time between certain increase pulses.

The adjustment ejection waveform WA includes a decrease waveform portion PA (first waveform portion) and an increase waveform portion PC (second waveform portion) in this order.

The decrease waveform portion PA changes in the sequence order of a zero potential va, a first negative potential vb, a second negative potential vc, a first negative potential vd, and a zero potential ve. The magnitude of the first negative potential is between the zero potential va and the second negative potential vc, and is, for example, ½ of the magnitude of the second negative potential.

The increase waveform portion PC changes in the sequence order of a zero potential ve, a first positive potential vf, a return potential vj, the first positive potential vf, a second positive potential vg, a first positive potential vh, and a zero potential vi.

That is, in the increase waveform portion PC, the voltage is increased in two steps, and then returned to the reference (zero) potential in two steps. Then, the voltage is temporarily decreased at a time point between the two steps of voltage increase. For example, as the return pulse waveform portion PP, the contraction is reduced by decreasing the voltage, the voltage is returned to a zero potential or lowered further to a negative potential side, and after a fixed time, the voltage is increased to relax to the contracted state.

The magnitude of the first positive potential is between the zero potential ve and the second positive potential vg, and is, as an example, ½ of the magnitude of the second positive potential.

The magnitude of the return potential vj is between the first positive potential vf and the second negative potential cc. For example, the return potential vi can be the same as the zero potential va.

That is, the adjustment ejection waveform WA has a waveform that changes in the sequence order of the zero potential va to the first negative potential vb to the second negative potential vc to the first negative potential vd to the zero potential ve to the first positive potential vf to the return potential vj to the first positive potential vf to the second positive potential vg to the first positive potential vh and then to the zero potential vi.

The transition from zero potential ve to the first positive potential vf can be referred to as a first step increase. The transition from the first positive potential vf to the second positive potential vg can be referred to as a second step increase. The transition from the second positive potential vg to the first positive potential vh can be referred to as the end of a first application step. The transition from the first positive potential vh to the zero potential vi can be referred to as the end of a second application step.

The decrease waveform portion PA is an example of a first waveform portion that drives the actuator 25 so as to reduce the pressure in the pressure chamber. The increase waveform portion PC is an example of a second waveform portion that drives the actuator 25 so as to increase the pressure in the pressure chamber.

At the start of the adjustment ejection waveform WA, the zero potential va is applied for a fixed time. After the zero potential va, application of the decrease waveform portion PA is started. The decrease waveform portion PA changes from the zero potential va to the first negative potential vb then to the second negative potential vc. After reaching the second negative potential vc, the decrease waveform portion PA continues to hold the second negative potential vc until the time D elapses from the start of the decrease waveform portion PA. The decrease waveform portion PA changes from the second negative potential vc to the first negative potential vd and then from the first negative potential vd to the zero potential ve after the time D elapses.

In adjustment ejection waveform WA. the increase waveform portion PC is started after the zero potential ve is held a predetermined time after the end of decrease waveform portion PA.

The increase waveform portion PC changes from the zero potential ve to the first positive potential vf, continues to hold the first positive potential vf for a predetermined time, and then changes to the second positive potential vg. Then, after a predetermined time from the start of application of the increase waveform portion PC, the increase waveform portion PC changes from the second positive potential vg to the first positive potential vh. Then the increase waveform portion PB continues to hold the first positive potential vh for a predetermined time, and then changes to the zero potential vi.

The time D is preferably half the natural vibration period of the pressure chamber 26. One half the natural vibration period of the pressure chamber 26 is defined as 1 acoustic length (AL). That is, the time D is preferably set to 1 AL. The time M of the contraction pulse after the second increase is desirably shorter than 1 AL, for example AL/2. The time S from the center of the expansion pulse of the decrease waveform portion PA to the center of the contraction pulse after the second increase of the increase waveform portion PC is desirably 2 AL.

As described above, the adjustment ejection waveform WA is obtained by adding the return pulse waveform portion PP at a timing between the first increase time and the second increase time of the second pulse to the reference ejection waveform WB for fine adjustments to reduce the ejection volume. That is, the adjustment ejection waveform WA has a return pulse waveform portion PP (a recess) at a predetermined timing with the increase waveform portion PC.

Figure 5:
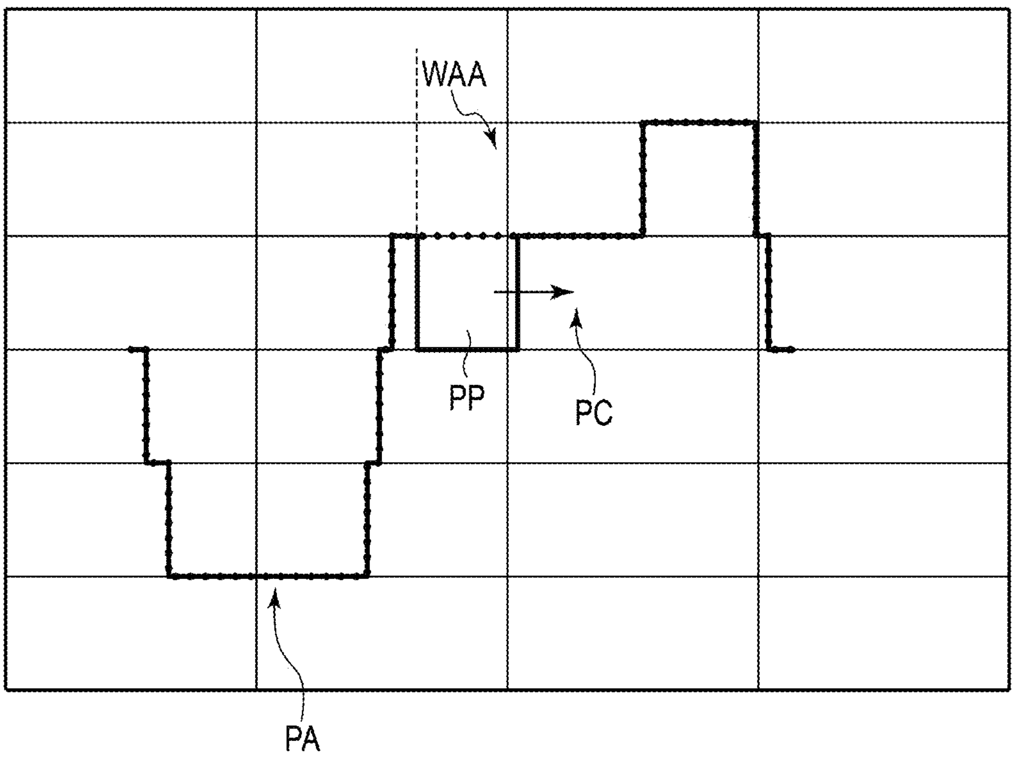
FIG. 5 illustrates a drive waveform in which a return pulse waveform portion is located at a first timing.
Figure 6:
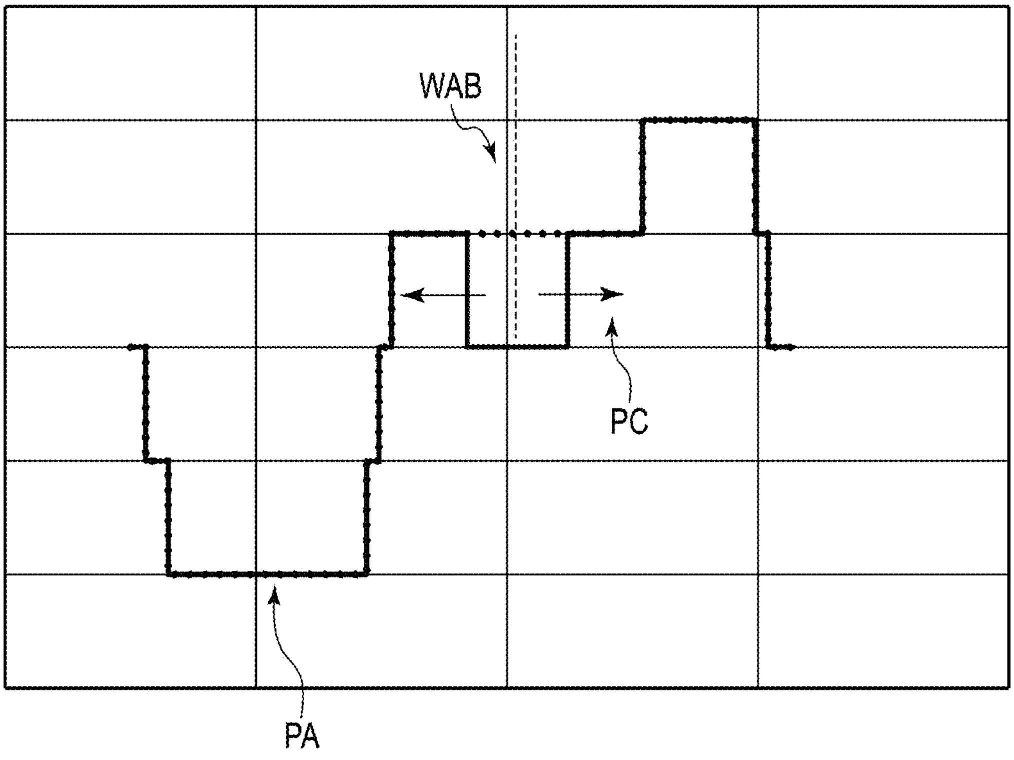
FIG. 6 illustrates a drive waveform in which a return pulse waveform portion is located at a second timing.
Figure 7:
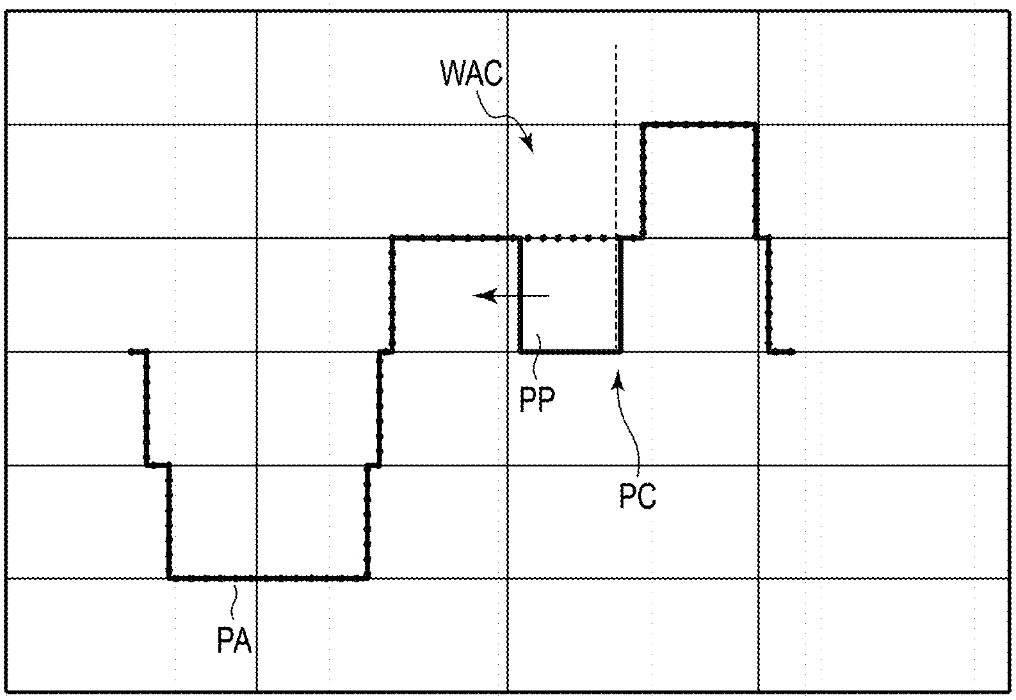
FIG. 7 illustrates a drive waveform in which a return pulse waveform portion is located at a third timing.

FIGS. 5 to 7 each illustrate waveforms with return pulse waveform portion PP at different timings. FIG. 5 is a drive waveform WAA in which the return pulse waveform portion PP is located shortly after the first increase. FIG. 6 is a drive waveform WAB in which the return pulse waveform portion PP is located near the center position between the first and second increases. FIG. 7 is a drive waveform WAC in which the return pulse waveform portion PP is located closer to the second increase than the first increase.

Figure 8:
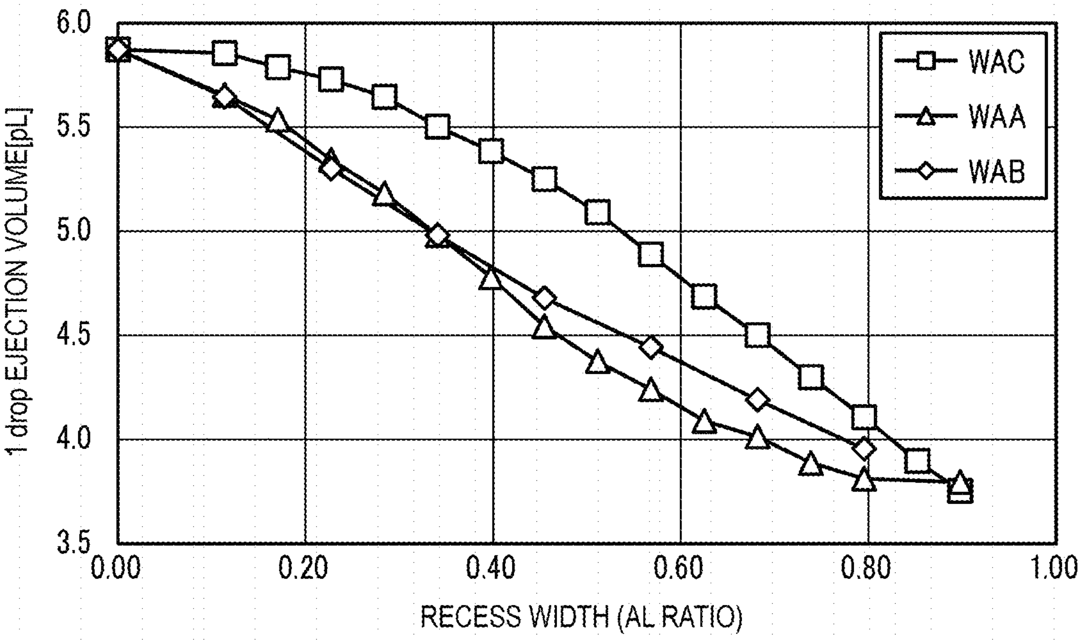
FIG. 8 is a graph change in ejection volumes with changes in recess widths for different timings of a return pulse waveform portion.

FIG. 8 is a graph illustrating a relationship between the ejection volume of one drop and a width of the recess (the return pulse waveform portion PP) for each of the timings of the three waveforms illustrated in FIGS. 5 to 7. According to FIG. 8, the ejection volume can be controlled by adjusting a return pulse width wj (the recess width of the return pulse waveform portion PP). In FIG. 8, the pulse width wj value is indicated as a ratio of the AL of the pressure chamber 26 (AL ratio).

Figure 9:
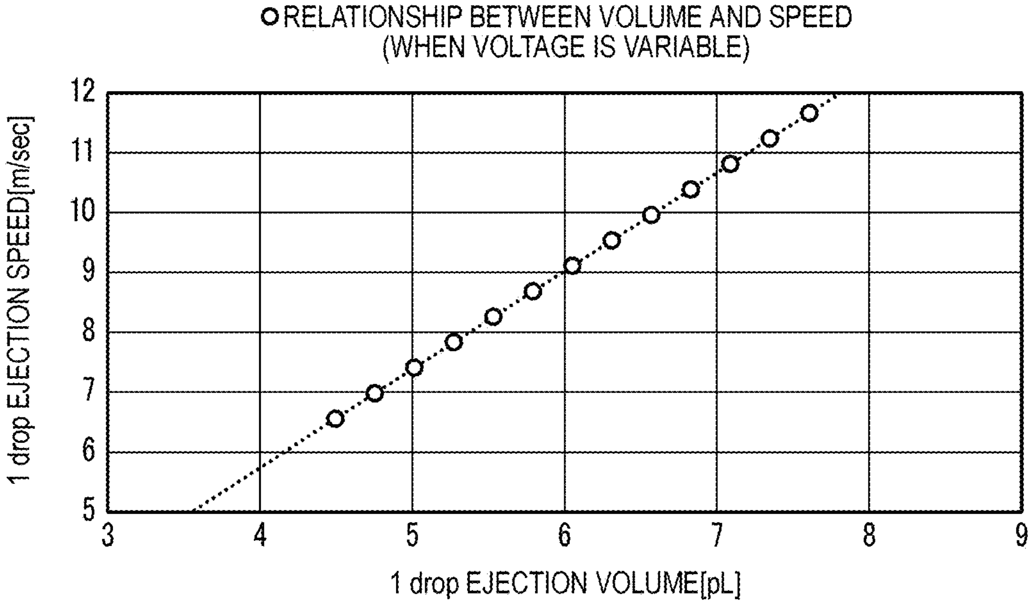
FIG. 9 is a graph illustrating a relationship between ejection volume and ejection speed when voltage is variable in a reference ejection waveform.

FIG. 9 is a graph illustrating a relationship between ejection volume (one drop) and ejection speed when the voltage changed for the reference ejection waveform WB. According to FIG. 9, for the reference ejection waveform WB, the ejection volume and the ejection speed are in a linearly proportional relationship. Accordingly, when the device is to be used for a small ejection volume, the ejection speed would also correspondingly decrease as the ejection volume decreases.

Figure 10:
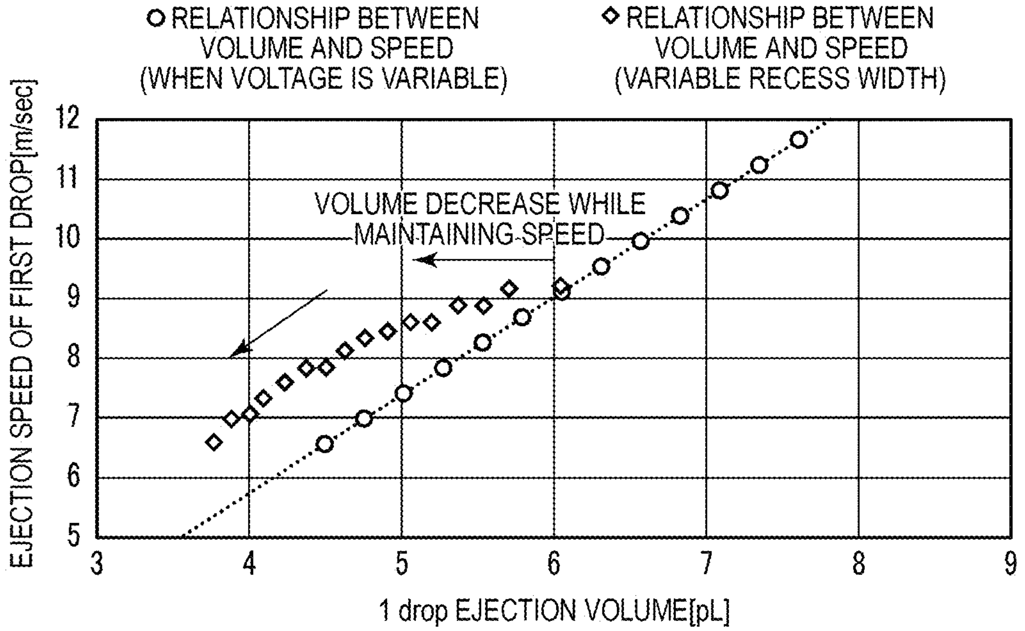
FIG. 10 is a graph illustrating a relationship between ejection speed and ejection volume when a return pulse (recess) width of an adjustment ejection waveform is varied.

A decrease in the ejection speed can cause a deterioration in printing quality if the deviation in landing position of ejected liquid droplets on the medium being printed becomes noticeable. FIG. 10 is a graph of the relationship of the FIG. 9 superimposed with the relationship between ejection speed and the ejection volume when the return pulse width wj is varied. In FIG. 10, the return pulse width wj value is again indicated by an AL ratio. According to FIG. 10, the linear proportional relationship between the ejected volume and the ejected speed as illustrated in FIG. 9 is deviated due to inclusion (and variation) of the return pulse waveform portion PP, and the volume may be decreased while better maintaining the droplet ejection speed. That is, it can be seen that if the return pulse width wj is kept relatively small, the ejection volume decreases while maintaining the ejection speed. On the other hand, as the return pulse width wj increases, the ejection speed tends to decrease as along with the ejection volume, but when compared to the same ejection volume for an ejection waveform without a return pulse, the ejection speed is increased by approximately 1 m/sec.

Accordingly, by adjusting the return pulse width wj and its timing, the ejection can be carried out with higher ejection speed for the same ejection volume as compared to the reference ejection waveform WB. Therefore, even when ejecting small liquid droplets, deterioration in printing quality that would otherwise occur due to the slower ejection speed can be avoided. For example, the position and width of the return pulse waveform portion PP can be set depending on the application, for example, depending on the ejection volume to be used.

According to this present embodiment, the ejection volume can be adjusted with lesser reduction in ejection speed. That is, by using the adjustment ejection waveform WA including the decrease waveform portion PA and the increase waveform portion PC with the return pulse waveform portion PP, small liquid droplets can be ejected outside of the standard linear proportional relationship of the election speed and ejection volume. Thus, ejection volume can be finely adjusted with lower losses in print quality.

Exemplary embodiments are not limited to the configurations described above, and can be implemented with appropriate modifications.

For example, the drive signal may be a combination of not only one ejection waveform but also a combination of a plurality of types of ejection waveforms. For example, it is also possible to have a return waveform that returns contraction between a plurality of increasing elements in the drive waveform applied to any one driving element portion 27 of the plurality of driving element portions 27 at any timing, and to drive the drive waveform by combining the return waveform with another waveform different from the return waveform. For example, the ejection waveform having the return waveform may be part of a multi-drop waveform that ejects the liquid droplet using a plurality of ejection waveforms, or may be a single waveform that ejects the liquid droplet using one ejection waveform.

Figure 11:
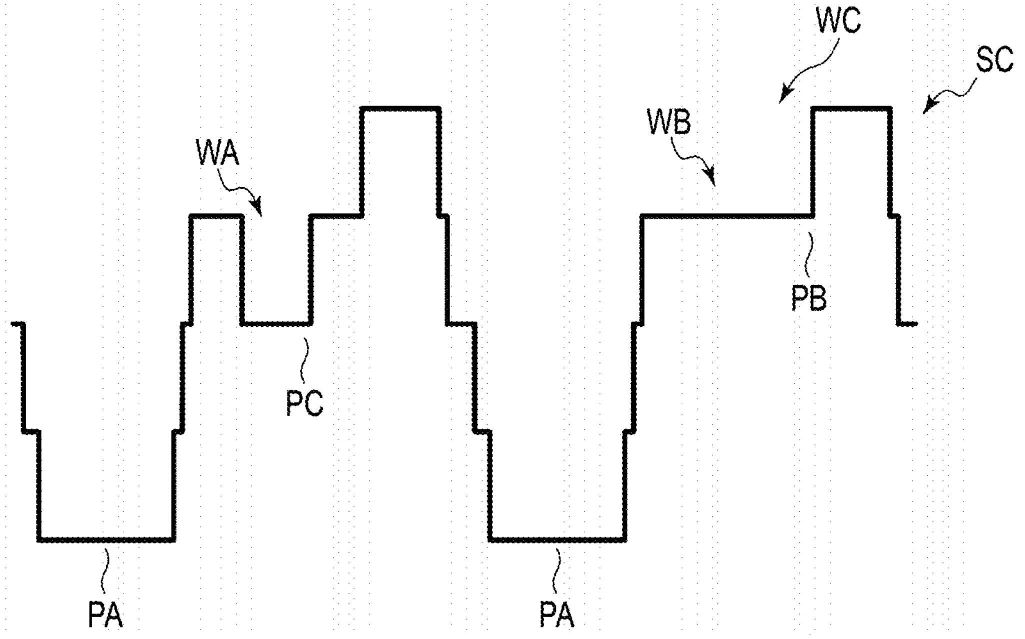
FIG. 11 is a waveform diagram illustrating a drive waveform in a second embodiment.

FIG. 11 illustrates a drive waveform WC of a drive signal SC according to a second embodiment. The drive waveform WC according to this second embodiment has a multi-drop waveform including the ejection waveform WA and the reference ejection waveform WB. The drive waveform WC according to this second embodiment is a waveform for ejecting two drops. The drive waveform WC includes reference ejection waveform WB after adjustment ejection waveform WA.

Figure 12:
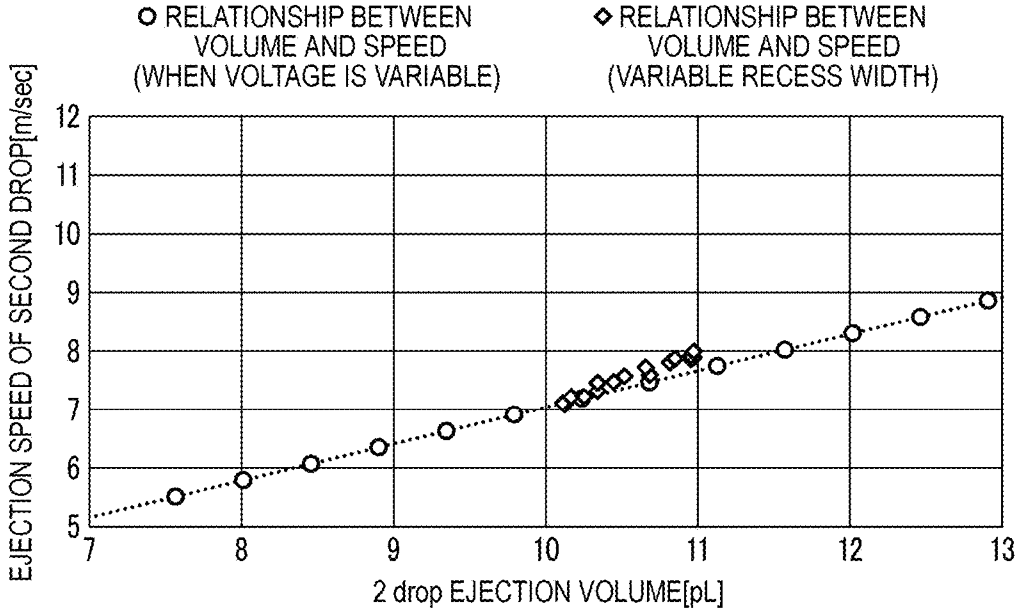
FIG. 12 is a graph illustrating a relationship between ejection volume and ejection speed for a second drop.
Figure 13:
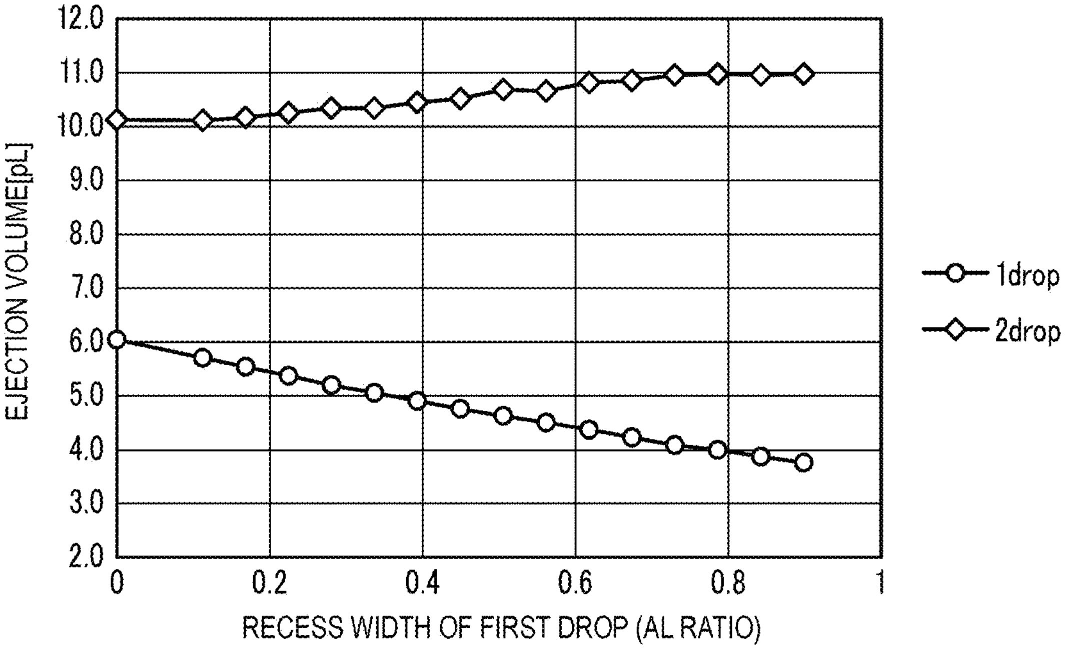
FIG. 13 is a graph illustrating an ejection volume for a first drop and a second drop when a return pulse (recess) width is changed.

FIG. 12 is a graph depicting a relationship between ejection volume and ejection speed for the second drop in the drive waveform WC according to this embodiment. FIG. 13 is a graph depicting the ejection volume for the first drop and the second drop when the return pulse width wj is changed in the drive waveform WC. From FIG. 12, the relationship between the ejection speed of the second drop and the ejection volume of the second drop is the same as that of the reference ejection waveform WB. From FIG. 13, it can be seen that when the return pulse width wj for the first drop is changed, the ejection volume of the first drop changes substantially, but the ejection volume for the second drop remains nearly constant with changes in the return pulse width wj used. That is, according to this second embodiment, the ejection volume of subsequent drops can be maintained while reducing the ejection volume of the first drop. Compared to a waveform in which the same adjustment ejection waveform WA is repeated a plurality of times, the number of switchings can be reduced, and preventing additional power consumption can also be expected.

The voltage values in the respective waveform elements are not limited to those in the embodiments described above. For example, the return potential of the return pulse waveform portion PP can be set to the zero potential as an example, but is not limited thereto. For example, the return potential may be a value lower than the first positive potential.

Further, the return pulse waveform portion PP can be implemented with appropriate modifications. For example, the return pulse waveform portion PP may have a step waveform that lowers voltage stepwise.

Figure 14:
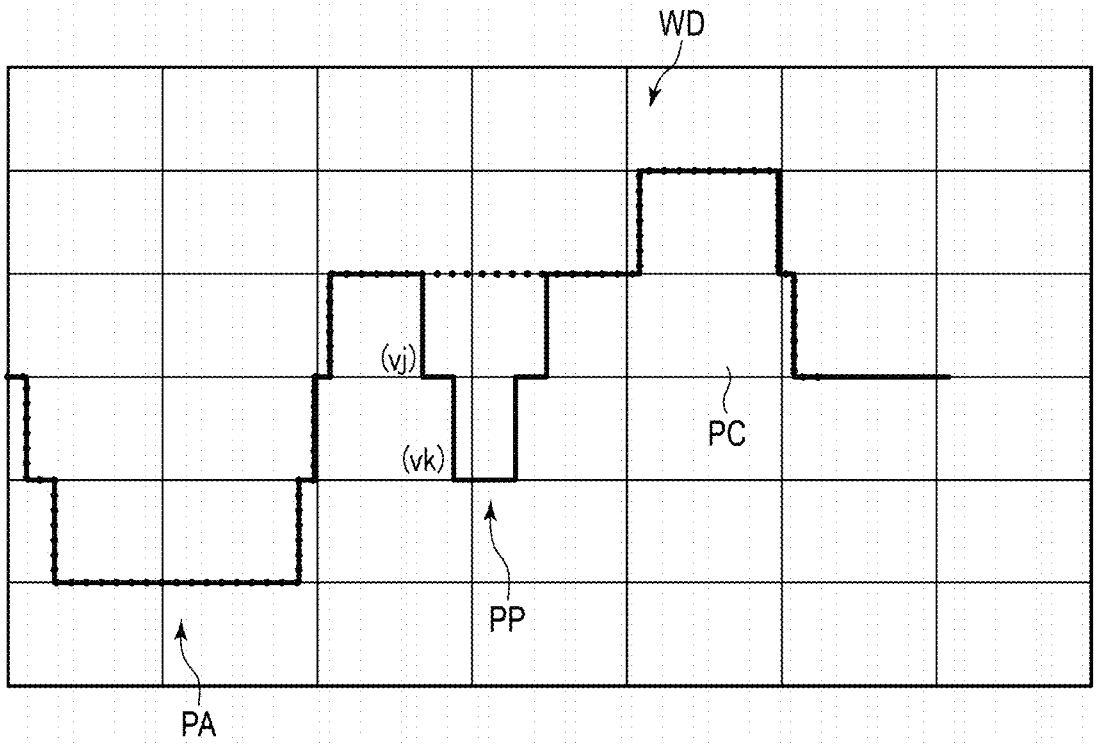
FIG. 14 is a waveform diagram illustrating a drive waveform according to a third embodiment.

FIG. 14 illustrates a drive waveform WD according to a third embodiment. The drive waveform WD includes a return pulse waveform portion PP having a step waveform. That is, in this third embodiment, the return pulse waveform portion PP lowers a voltage in two steps from a first return potential vj to a second return potential vk, and then increases the voltage in two steps after a predetermined time. That is, in the drive waveform WD, the return waveform portion is a two-step waveform and the voltage is changed to a potential lower than the reference potential in the process of reducing or eliminating contraction at a time between a first increase and a second increase.

Figure 15:
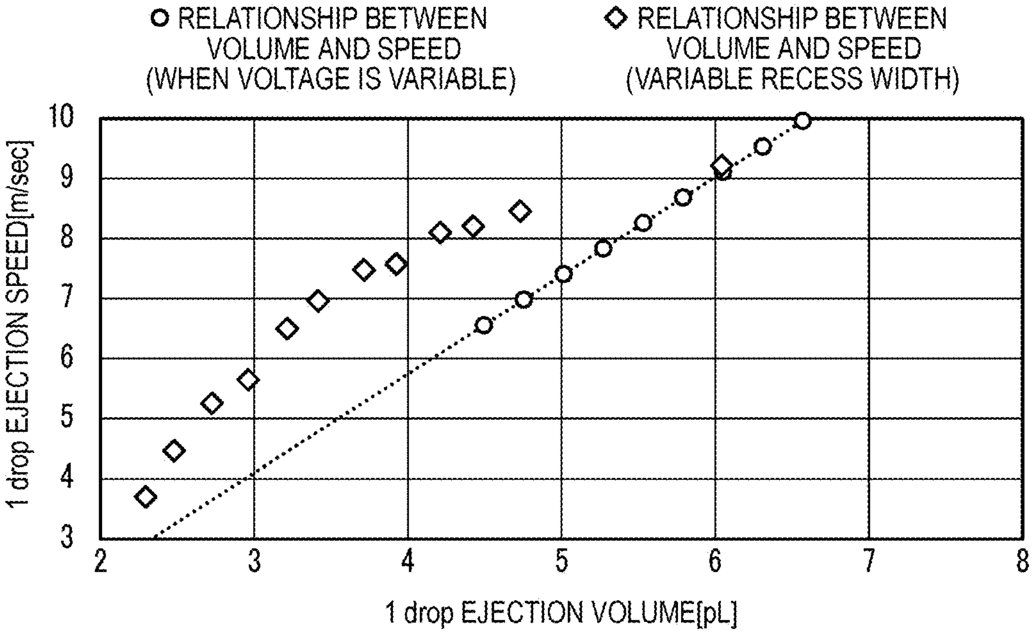
FIG. 15 is a graph illustrating a relationship between ejection volume and ejection speed for a drive waveform.
Figure 16:
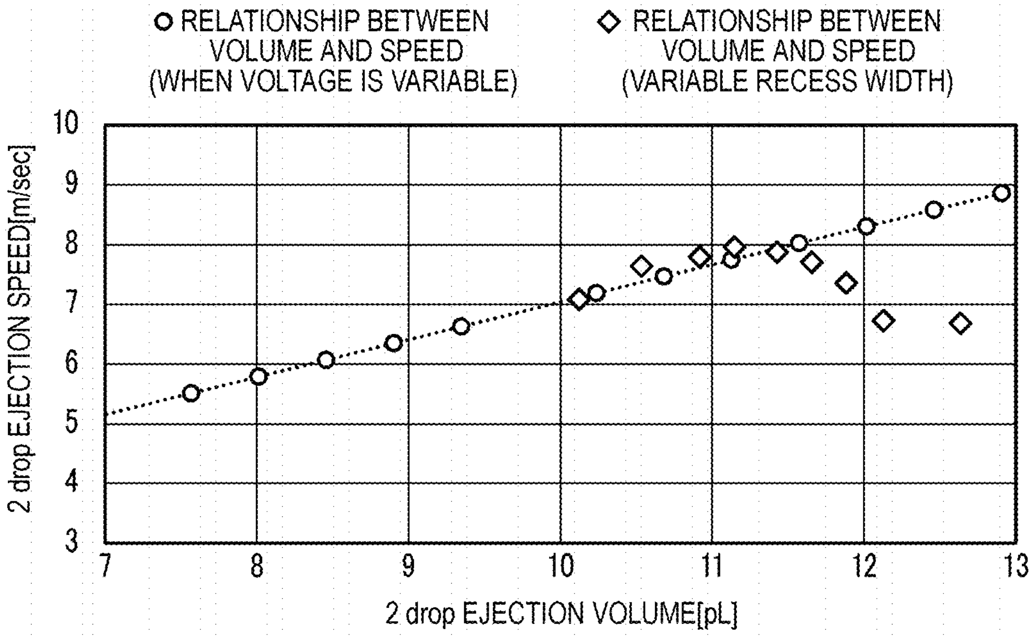
FIG. 16 is a graph illustrating the relationship between ejection volume and ejection speed for a second drop.
Figure 17:
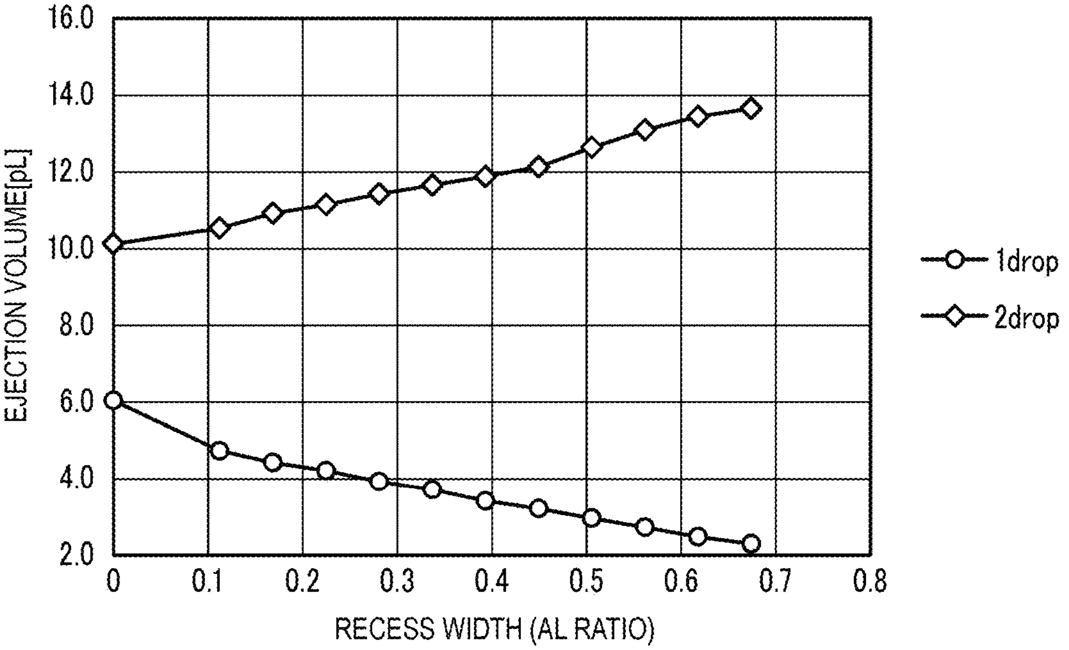
FIG. 17 is a graph illustrating a relationship between a return pulse (recess) width and ejection volume for a first drop and a second drop for a drive waveform.

FIG. 15 is a graph depicting a relationship between ejection volume and ejection speed when the drive waveform WD is used as the ejection waveform of a first drop. FIG. 16 is a graph depicting a relationship between ejection volume and ejection speed for a second drop when the drive waveform WD is used as the ejection waveform of a first drop. FIG. 17 is a graph depicting a relationship between the return pulse width wj and ejection volumes of the first drop and second drop when the drive waveform WD is used as the ejection waveform of the first drop.

In FIG. 15, it can be seen that the ejection volume can be reduced to smaller liquid droplets by using the drive waveform WD for the first drop. The drive waveform WD has a small region in which the ejection speed is kept basically constant even though ejection volume decreases, and it can be useful if a liquid droplet volume somewhat smaller than that of the reference ejection waveform is to be used at high ejection speed.

However, as illustrated in FIGS. 16 and 17, there is a region in which ejection becomes unstable due to the influence of residual vibration when the return pulse width wj becomes wider. Therefore, the return pulse width wj is preferably set to about 0.3 AL or less.

An example is illustrated in which the adjustment ejection waveform WA is used only for the first drop, and the reference ejection waveform WB is used for the second and subsequent drops, but the disclosure is not limited thereto. For example, the adjustment discharge waveform WA can be applied to any or all of the second and subsequent drops.

In each of the embodiments described above, the decrease waveform portion PA has a step waveform in which the voltage is lowered stepwise in two stages, but the disclosure not limited thereto. For example, the waveform may transition from the zero potential va to the second negative potential vc and return from the second negative potential vc to the zero potential va after a fixed time elapses.

Furthermore, the waveforms are not limited to those with changes between five potentials, but, in other examples, may have changes between six or more potentials.

In some examples, a non-ejection waveform portion or the like that does not cause an ejection of liquid may be included as at least one of the waveform portions of a multi-drop waveform.

The configuration of the liquid ejection head 1 is not limited to the example described above, and other types of heads may be adopted. For example, the liquid ejection head 1 may drive a liquid ejection section by deforming the drive element to vibrate a diaphragm provided between the pressure chamber and the drive element.

In an example, the drive circuit 24 includes a driver IC 241. In other examples, various control devices such as one connected to the liquid ejection head 1 but provided outside the liquid ejection head 1 may be used as the drive device.

In some examples, the liquid ejection apparatus 2 can be an inkjet recording device, a printer, a 3D printer, an industrial manufacturing machine, and medical applications device, or the like and such examples can be made smaller, lighter, and lower in cost by incorporation of aspects of described embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A drive device, comprising:

a drive circuit configured to output a drive signal waveform to be applied to an actuator of a liquid ejection head, wherein the drive signal waveform includes an adjustment ejection waveform portion that causes liquid to be ejected once by a cycle of expansion and contraction and includes:

a first portion having an expansion pulse that decreases pressure in a pressure chamber of the actuator, and a second portion having a contraction pulse that increases pressure in the pressure chamber, the contraction pulse including a plurality of voltage increase changes that change the voltage applied to the actuator stepwise and a return pulse that is between a pair of voltage increase changes in the plurality of voltage increase changes, the return pulse changing from a first voltage level that is less than a maximum voltage level of the contraction pulse to a second voltage level that is greater than a minimum voltage level of the expansion pulse.

2. The drive device according to claim 1, wherein the difference between the first voltage level and the second voltage level is equal to the magnitude of a voltage increase change in the plurality of voltage increase changes.

3. The drive device according to claim 1, wherein the difference between the first voltage level and the second voltage level is equal to one-half the magnitude of the expansion pulse.

4. The drive device according to claim 1, wherein the return pulse changes in discrete steps from the first voltage level to the second voltage level.

5. The drive device according to claim 4, wherein the return pulse changes in discrete steps from the second voltage level to first voltage level.

6. The drive device according to claim 5, wherein magnitudes of each of the discrete steps are equal.

7. The drive device according to claim 1, wherein the expansion pulse changes voltage in discrete steps from a reference voltage level to the minimum voltage level.

8. The drive device according to claim 7, wherein the expansion pulse changes voltage in discrete steps from the minimum voltage level to the reference voltage level.

9. The drive device according to claim 1, wherein the drive signal waveform is a multi-drop waveform having a plurality of drop waveforms in sequence, and the adjustment ejection waveform is part of at least one of the drop waveforms of the plurality of drop waveforms.

10. The drive device according to claim 9, wherein the adjustment ejection waveform is part of the first drop waveform in the sequence of the plurality of drop waveforms.

11. The drive device according to claim 10, wherein the second drop waveform in the sequence of the plurality of drop waveforms is a reference ejection waveform including an expansion pulse that decreases pressure in the pressure chamber and a contraction pulse that increases the pressure in the pressure chamber in discrete steps.

12. The drive device according to claim 1, wherein the drive circuit is configured to control an ejection volume by adjusting a pulse width of the return pulse.

13. The drive device according to claim 1, wherein the second voltage level is a ground potential.

14. A liquid ejection head, comprising:

an actuator that expands and contracts a pressure chamber to eject a liquid from a nozzle associated with the pressure chamber; and a drive circuit configured to output a drive signal waveform to be applied to the actuator, wherein the drive signal waveform includes an adjustment ejection waveform portion that causes liquid to be ejected once by a cycle of expansion and contraction and includes:

a first portion having an expansion pulse that decreases pressure in a pressure chamber of the actuator, and a second portion having a contraction pulse that increases pressure in the pressure chamber, the contraction pulse including a plurality of voltage increase changes that change the voltage applied to the actuator stepwise and a return pulse that is between a pair of voltage increase changes in the plurality of voltage increase changes, the return pulse changing from a first voltage level that is less than a maximum voltage level of the contraction pulse to a second voltage level that is greater than a minimum voltage level of the expansion pulse.

15. The liquid ejection head according to claim 14, wherein the difference between the first voltage level and the second voltage level is equal to the magnitude of a voltage increase change in the plurality of voltage increase changes.

16. The liquid ejection head according to claim 14, wherein the drive signal waveform is a multi-drop waveform having a plurality of drop waveforms in sequence, and the adjustment ejection waveform is part of at least one of the drop waveforms of the plurality of drop waveforms.

17. The liquid ejection head according to claim 14, wherein the drive circuit is configured to control an ejection volume by adjusting a pulse width of the return pulse.

18. A printer, comprising:

an inkjet head; and a sheet conveying mechanism configured to position a sheet relative to the inkjet head, wherein the inkjet head includes:

an actuator that expands and contracts a pressure chamber to eject a liquid from a nozzle associated with the pressure chamber; and a drive circuit configured to output a drive signal waveform to be applied to the actuator, wherein the drive signal waveform includes an adjustment ejection waveform portion that causes liquid to be ejected once by a cycle of expansion and contraction and includes:

a first portion having an expansion pulse that decreases pressure in a pressure chamber of the actuator, and a second portion having a contraction pulse that increases pressure in the pressure chamber, the contraction pulse including a plurality of voltage increase changes that change the voltage applied to the actuator stepwise and a return pulse that is between a pair of voltage increase changes in the plurality of voltage increase changes, the return pulse changing from a first voltage level that is less than a maximum voltage level of the contraction pulse to a second voltage level that is greater than a minimum voltage level of the expansion pulse.

19. The printer according to claim 18, wherein the difference between the first voltage level and the second voltage level is equal to the magnitude of a voltage increase change in the plurality of voltage increase changes.

20. The printer according to claim 18, wherein the drive signal waveform is a multi-drop waveform having a plurality of drop waveforms in sequence, and the adjustment ejection waveform is part of at least one of the drop waveforms of the plurality of drop waveforms.

* * * * *